United States Patent [19]
Hasquenoph et al.

[11] 3,854,680
[45] Dec. 17, 1974

[54] DEVICE FOR STEADYING LOADS SUSPENDED FROM AIRCRAFTS

[75] Inventors: Jean Henri Hasquenoph, Lagny; Pierre Fernand Coutin, Paris, both of France

[73] Assignee: R. Alkan & Cie, Valenton, France

[22] Filed: Mar. 7, 1974

[21] Appl. No.: 449,014

Related U.S. Application Data
[62] Division of Ser. No. 366,054, June 1, 1973.

[52] U.S. Cl........... 244/118 R, 89/1.5 G, 244/137 R
[51] Int. Cl................................................ B64d 1/02
[58] Field of Search .................... 244/118 R, 137 R; 294/83 AE, 83 AB, 83 RA, 102 R; 89/1.5 ALL, 1.606; 248/119 R; 24/230 AT, 24/230 AV

[56] References Cited
UNITED STATES PATENTS
3,268,188  8/1966  La Roe et al. .................. 244/137 R
3,784,132  1/1974  Newell .......................... 244/137 R Primary Examiner—Trygve M. Blix
Assistant Examiner—Galen L. Barefoot
Attorney, Agent, or Firm—Ulle C. Linton

[57] ABSTRACT

This device for steadying, notably against lateral oscillation, a load releasably suspended from an aircraft comprises a pair of fork-shaped hooks rigid with the aircraft and co-acting with bridge pieces rigid with the load and having a flat top face, and a pair of wedge members associated with each hook; each wedge member consists of a piston engaging the top face of the bridge piece under the action of a fluid under pressure passing through a non-return valve.

2 Claims, 1 Drawing Figure

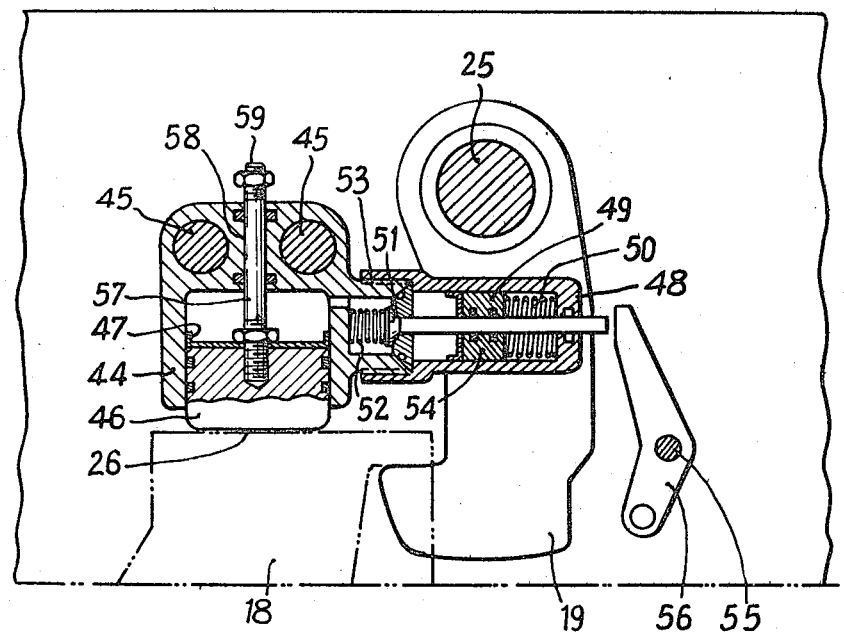

DEVICE FOR STEADYING LOADS SUSPENDED FROM AIRCRAFTS

This application is a division of Ser. No. 366,054, filed June 1, 1973.

BACKGROUND OF THE INVENTION

1. Field of the Invention

The present invention relates to means for steadying loads suspended from aircrafts.

2. Brief Description of the Prior Art

It is know that loads suspended from aircrafts comprise as a rule tapped cavities engaged by correspondingly screw-threaded shanks formed integrally with suspension rings. The hooks carried by the supporting or jettisoning device engage these rings for actually carrying the load. Since these rings are aligned longitudinally, the loads tend to oscillate laterally under the influence of lateral accelerations or other aerodynamic effects, so that it is customary to steady these loads, when supported by the aircraft, by means of transverse bearing elements.

An arrangement generally employed to this end consists in utilizing four steadying or wedging screws engaging tapped orifices formed in four fixed bearing arms and clamping the load laterally.

This arrangement, although very efficient, has various drawbacks: in fact, the bearing arms are relatively heavy and the assembly including the four wedging or steadying screws is objectionable on account of its poor aerodynamic contour. On the other hand, the steadying operation proper requires the tightening of four screws.

SUMMARY OF THE INVENTION

It is the essentiel object of the present invention to provide an improved device for steadying loads suspended from aircrafts which eliminates the inconveniences of prior art systems, while reducing the span of the bearing arms and providing, if desired, the automatic steadying of the load without requiring any particular manoeuvre, except the closing of the load suspension hooks.

The steadying device according to the invention is adapted to be associated with a load suspended from a pair of fork-shaped hooks rigid with the carrier member of the aircraft and coacting with bridge pieces rigid with the load and having a flat top face, and comprises a hydraulic piston associated with each fork-shaped hook and adapted to vertically engage the top face of the bridge piece under the action of a substantially incompressible fluid passing through a valve, the backward movement of the piston being prevented by the automatic closing of said valve.

BRIEF DESCRIPTION OF THE DRAWING

A typical form of embodiment of the present invention will now be described in detail with reference to the attached drawing which shows a vertical section of this device.

DESCRIPTION OF THE PREFERRED EMBODIMENT

In the drawing is shown the bridge piece 18 rigid with the load (not shown) and its top bearing surface 26, as well as the fork-shaped hook 19 pivoted to the carrier-member 2 of the aircraft by means of the shaft 25. In a cylinder 44 rigidly secured by means of members 45 to the support 2, a piston 46 provided with a fluid-tight seal or diaphragm 47 is slidably mounted and engages the face 26 of member 18 by virtue of the fluid under pressure, such as oil, contained in the device. This initial pressure is obtained by means of a coil compression spring 50 urging and auxiliary piston 49 in a cylinder 48 extending laterally with respect to the main cylinder 44. The hydraulic fluid clears a non-return valve 51 urged by a light spring 52 and transmits the pressure to the main piston 46. The auxiliary piston 49 is slidably mounted in said cylinder 48 and the latter is screwed on a screw-threaded boss 53 formed on the main cylinder 44, as shown. The valve 51 is slidably mounted in said auxiliary piston 49 and the necessary fluid seal therebetween is provided by O-rings 54.

Should play develop between the piston 46 and the contact face 26, it would be taken up immediately by the downward movement of this piston which cannot rise since the oil cannot flow in the valve closing direction. When opening the hook 19 the lever 56 fulcrumed at 55 is pivoted in the counter-clockwise direction, as seen in the drawing, thus unseating the valve 51 and permitting the free flow of fluid and therefore the free movement of piston 46 against, and except for, the force of spring 50. Accessorily, a rod 57 secured coaxially to the piston 46 and formed with a head 59 may be provided for limiting the permissible stroke of piston 46, this rod 57 passing through a guide bore 58 provided with O-rings.

What we claim is:

1. Device for steadying loads suspended from aircrafts, wherein fork-shaped hooks rigid with a carrier member of the aircraft co-act with bridge pieces with the load and having a flat top face, comprising a pair of wedge members associated with each fork-shaped hook and transversely disposed on the opposite sides of said hook, each wedge member consisting of a hydraulic piston sliding within a cylinder rigid with the carrier member of the aircraft and in a direction perpendicular to the top face of the bridge piece in order to engage said top face in response to a fluid under pressure supplied through a non-return valve.

2. Device according to claim 1, wherein said fork-shaped hook engages during its opening movement one end of a pivoting lever of which the other end engages in turn an extension of said non-return valve to open said valve and allow the release of the hydraulic piston.

\* \* \* \* \*